(12) United States Patent
De Coi et al.

(10) Patent No.: US 8,819,992 B2
(45) Date of Patent: Sep. 2, 2014

(54) MONITORING APPARATUS AND PIVOTING DOOR

(71) Applicant: Cedes AG, Landquart (CH)

(72) Inventors: Beat De Coi, Sargans (CH); Tobias Leutenegger, Chur (CH)

(73) Assignee: Cedes AG, Landquart (CH)

( * ) Notice: Subject to any disclaimer, the term of this patent is extended or adjusted under 35 U.S.C. 154(b) by 0 days.

(21) Appl. No.: 13/852,260

(22) Filed: Mar. 28, 2013

(65) Prior Publication Data

US 2013/0269255 A1 Oct. 17, 2013

Related U.S. Application Data

(60) Provisional application No. 61/619,045, filed on Apr. 2, 2012.

(30) Foreign Application Priority Data

Apr. 2, 2012 (EP) .................................. 12002391

(51) Int. Cl.
*E05F 15/20* (2006.01)
(52) U.S. Cl.
USPC .............................................. 49/25; 49/334
(58) Field of Classification Search
USPC .............. 49/25, 333, 334, 338; 318/1, 3, 6, 9, 318/480
See application file for complete search history.

(56) References Cited

U.S. PATENT DOCUMENTS

| | | | |
|---|---|---|---|
| 2,946,931 A * | 7/1960 | Vernon Durbin | 361/173 |
| 3,852,592 A | 12/1974 | Scoville et al. | |
| 7,068,179 B2 * | 6/2006 | Snell et al. | 340/686.6 |
| 7,084,388 B2 * | 8/2006 | Rejc | 250/221 |
| 7,762,022 B2 * | 7/2010 | Stadler et al. | 49/506 |
| 8,326,084 B1 * | 12/2012 | Marrion et al. | 382/285 |
| 8,510,990 B2 * | 8/2013 | Agam et al. | 49/28 |

FOREIGN PATENT DOCUMENTS

| | | |
|---|---|---|
| DE | 10 2008 044 990 A1 | 3/2010 |
| EP | 1 375 808 A2 | 1/2004 |
| WO | 00/08286 | 2/2000 |
| WO | 2009/090097 | 7/2009 |

OTHER PUBLICATIONS

European Search Report, European Application No. 12002391.6, dated Feb. 26, 2013 (4 pages).
European Office Action (Application No. 12 002 391.6) dated Dec. 9, 2013.
European Office Action (Application No. 12 002 391.6) dated Apr. 15, 2014.

* cited by examiner

*Primary Examiner* — Jerry Redman
(74) *Attorney, Agent, or Firm* — Burr & Brown, PLLC

(57) ABSTRACT

Monitoring apparatus for monitoring a movement element pivoted between open and closed states of an opening to be closed, the apparatus having a sensor for detecting an object and for monitoring a spatial angle originating at or near the rotation axis. The sensor is fitted at or near the rotation axis and includes a transmitter and receiver for transmitting and receiving radiation within the spatial angle. The sensor emits detection signals generated by the receiver when radiation is detected. The monitoring apparatus includes an evaluation unit that evaluates the detection signals depending on the angular position of the detected radiation in the spatial angle and determines whether an object has been detected and/or the position of the detected object. The evaluation unit draws a distinction between the movement element and an object depending on the current angular position of the movement element.

18 Claims, 6 Drawing Sheets

MONITORING APPARATUS AND PIVOTING DOOR

CROSS REFERENCE TO RELATED APPLICATIONS

This application claims the benefit under 35 USC §119(e) of U.S. Provisional Application 61/619,045, filed Apr. 2, 2012, and claims the benefit under 35 USC §119(a)-(d) of European Application No. 12 002 391.6 filed Apr. 2, 2012, the entireties of which are incorporated herein by reference.

FIELD OF THE INVENTION

The invention relates to a monitoring apparatus and a pivoting door.

BACKGROUND OF THE INVENTION

The prior art discloses pivoting doors which are mounted such that they can rotate about a vertical rotation axis and, in addition, have a motorized drive. These pivoting doors are often equipped with an opening sensor, the control system of the opening sensor opening the door by means of the motorized drive when a person approaching the door is detected. In addition, so-called safety sensors are known in pivoting doors of this kind, the safety sensors stops the movement of the pivoting door as soon as an object which could collide with the opening door is detected.

SUMMARY OF THE INVENTION

The object of the present invention is to propose a monitoring apparatus in the case of which the susceptibility to faults during operation can be improved.

Accordingly, a monitoring apparatus according to the present invention for monitoring the movement of a movement element which is mounted such that it can be pivoted about a rotation axis and which is driven by means of a drive comprises a sensor for detecting an object and for monitoring a spatial angle. The movement element can be pivoted between an open and a closed state of an opening which is to be closed. A movement element is, for example, a pivoting door which allows access to a space, wherein the opening which leads to the space can be closed by means of the door element. A pivoting door can be mounted in a rotatable manner by means of a door hinge, for example. A rotation axis is defined by the door hinge being fitted. The movement element itself, for example the door element, is moved about the rotation axis during opening and during closing by means of a motor.

In the monitoring apparatus according to the present invention, the sensor can be fitted in the region of the rotation axis. This measure can result in the spatial angle which is to be monitored being arranged such that the spatial angle has its origin in the region of the rotation axis. The term 'spatial angle' within the meaning of the invention does not necessarily comprise a conical spatial angle. Instead, the term 'spatial angle' within the meaning of the present invention means a region of the space which is defined by it being possible for the origin, that is to say the point at which the receiver or transmitter is situated, to be connected to all points of this spatial region or spatial angle by means of a rectilinear connection or a beam. The spatial angle can therefore also be, for example, a cone in which a segment has been detached through the lateral surface along the longitudinal axis.

The sensor itself comprises a transmitter and a receiver for transmitting and receiving electromagnetic detection radiation. The electromagnetic radiation is preferably infrared light (IR). However, it is also feasible, in principle, to use ultraviolet light (UV) or visible light (wavelength of approximately 400 nm to 800 nm, where nm: abbreviation for nanometers). The transmitter and receiver can be arranged in a common housing of the sensor.

The light can be emitted, in principle, within the corresponding spatial angle; however, in general, the light is emitted into the space over a relatively large region. Furthermore, electromagnetic radiation is usually received or detected only within the spatial angle which is to be monitored. The receiver is therefore generally designed and set up such that the corresponding spatial angle which is to be monitored is detected, but not a further region which goes beyond the spatial angle. As soon as the receiver detects the electromagnetic radiation, it emits detection signals. The detection signals are, for example, electrical signals. However, it is also feasible for these detection signals to be converted into optical signals (with a light-emitting diode or IR diode).

Furthermore, the monitoring apparatus comprises an evaluation unit which is designed to evaluate the detection signals depending on their position in the spatial angle. This means that the receiver can be used to establish the direction from which the detected signals arrive. It may also be possible to determine the distance of the corresponding detected object from the receiver, for example, by measurement of the delay time. Therefore, if an object is detected, it is also possible to determine the position of the object. The corresponding detection signal contains this corresponding information, that is to say whether an object is detected at all and the position of the object within the spatial angle.

The sensor can be fitted in the region of the rotation axis such that the movement element at least enters the detected spatial angle, or at least partially passes through the spatial angle, when it moves about the rotation axis.

In the monitoring apparatus according to the present invention, the evaluation unit is designed to draw a distinction between the movement element and an object depending on the current angular position of the movement element. The evaluation unit is therefore designed to receive signals which can contain information about the current angular position of the movement element in any form. A form of reception may be direct transfer of the angular position. However, it is also feasible for the corresponding angular position to be encoded in any form.

It is feasible for the angular position to be measured and then transferred to the evaluation unit, or else for the angular position to already be available and merely to be transferred. As a result of the evaluation unit also taking into consideration the current angular position of the movement element during the evaluation, it is possible to blank out the movement element within the detected spatial angle region. This measure can prevent "faulty detection operations" because it is possible to draw a distinction between, in the case of an opening sensor, opening the door only when a person actually approaches the door and, in the case of a safety sensor, stopping the movement when there is actually a risk of collision with the movement element. This prevents detection of the door itself being interpreted as an object or person by the sensor. If the receiver detects a radiation signal, a position in the spatial region which is to be detected can be assigned to this radiation signal. The emitted detection signal, which is delivered to the evaluation unit, carries this information. The evaluation unit uses the current angular position of the movement element for evaluation purposes. The angular region, which can be assigned to the movement element in its current position, can be blanked out, that is to say this region is either not taken into consideration in the evaluation or it is assumed that detection in this region is detection of the movement element itself and not of an object or a person.

In order to be able to draw a distinction between an object or a person and the movement element, additional information which allows this distinction to be drawn is generally required. If the evaluation unit is designed such that the current angular position of the movement element is transmitted directly by the control apparatus or the control system of the drive of the movement element, the additional information that an object which is located in this corresponding angular region is the movement element is given by the angular position having been transferred by the control apparatus of the drive. However, if the current angular position were to be delivered directly by the monitoring apparatus or the sensor of the monitoring apparatus, additional information which indicates that the detected object is the movement element is required.

In an advantageous embodiment of the present invention, the sensor for detecting the object and for monitoring the spatial angle is in the form of a distance sensor for determining the distance of an object. A sensor of this kind may be, in particular, a time-of-flight sensor (ToF sensor). A ToF sensor of this kind operates by means of a delay time measuring device. By way of example, a different signal or a frequency which has a lower frequency than the frequency of light is modulated onto the light signal which is emitted from the sensor by means of the transmitter. The signal which is received back in the receiver by means of reflection then has a phase shift with respect to the emitted light, it being possible to determine this phase shift and this phase shaft containing information about the delay time. Sensors of this kind have the advantage that they have a particularly low price and therefore allow cost advantages. In addition, distance sensors make it possible to determine the distance of a detected object from the sensor, it being possible to utilize this in an advantageous manner in the present invention in order to establish whether there is a chance of the movement element colliding with the object or whether the door has to be opened because a person is approaching the door. Furthermore, the ToF sensor can also be in the form of a 3D sensor.

The angular position alone is not always sufficient to obtain this information, especially since, for example, a person who is relatively far away from the movement element will not or cannot collide with the opening door. It is therefore made possible to also detect the actual movement space of the movement element and its extension by means of the sensor of the monitoring apparatus. In the case of a pivoting door, the evaluation unit can, for example, contain information about the radius to which the movement element opens. An object which is further away from the sensor than this radius can generally not constitute a collision risk.

The door is automatically opened, inter alia, by means of a control apparatus for controlling the drive of the movement element and the drive itself. The drive is generally a motor with which the door, in particular a pivoting door, can be opened. Within the meaning of the present invention, control means open-loop control and/or closed-loop control. The control apparatus receives, for example, a signal from a sensor, for example an opening sensor, that a person is approaching the door, and the control apparatus accordingly actuates the motor and the movement element is set in motion, that is to say is moved to an open state. The control apparatus can also be connected to a safety apparatus or a safety sensor, and therefore when the safety sensor detects an object with which the movement element may collide, the movement of the door is stopped. In this case, the opening signal of an opening sensor can also be overridden since avoidance of a collision generally has priority over opening of the door. In most cases, the current angular position of the movement element can be read from this control apparatus. The angular position can be obtained, in principle, in a different way. It is feasible, for example, for the motor or the drive to have its own rotary encoder or angle encoder by means of which the information about the current angle of the movement element can be read.

It is also feasible for the time or a measure of the time for which the motor has already currently driven the movement element to be determined or read, and for this information to be used as a measure of the current angular position. It is also feasible for the control apparatus to have its own angle encoder which determines the current angular position of the movement element. Therefore, a transmission apparatus which connects the control unit to the evaluation unit and accordingly transmits the current angular position is provided in a simple refinement of the invention. It is further feasible for the evaluation unit to be directly connected to the motor or to the drive itself, provided that the current angular position can also be read directly from the motor.

The transmission unit can also be designed in a different way. It is feasible, for example, for the transmission unit to merely be a data cable which connects the control apparatus and/or the drive to the evaluation unit. This is sufficient, for example, when firstly the evaluation unit and secondly the control apparatus or drive comprise an interface which allows said information to be directly emitted or directly read in. However, it is also feasible for an electrical signal which contains said information to be tapped off within the respective circuit. In principle, the angular position can be read out or the corresponding signal may contain the position in an encoded form. A particularly advantageous feature of this embodiment is that the information about the current angular position of the movement element is obtained independently of a sensor of the monitoring apparatus. In addition, this refinement is comparatively low cost because generally only one connection to the control unit or to the drive has to be established.

A further refinement makes it possible to wirelessly transfer the current angular positions. It is also feasible, for example, for the angular position to be transferred by radio. By virtue of this refinement, disruptive cables can be avoided and also a more compact structure with savings in respect of space is made possible.

The transmission apparatus can, however, also be in the form of a communications apparatus, that is to say an apparatus which is designed to receive and transmit instructions. It is feasible, for example, for the control apparatus and the drive or evaluation unit to communicate with one another by means of a bus. It is also feasible for data to be interchanged, but also, in principle, for the data to flow only in one direction. The evaluation unit can, for example, request current angular positions of the movement element from the transmission apparatus at regular intervals by means of corresponding instructions. The transmission apparatus then in turn sends instructions to the drive or the control apparatus which then delivers the current angular position and the angular position is finally transferred to the evaluation unit. It is further possible, as already described above, for the transfer apparatus to comprise only one connection to the control apparatus or to the drive and for the request made by the evaluation unit to be passed directly to the control apparatus or the drive.

The question of whether the transfer apparatus is in the form of a separate circuit or merely in the form of a cable depends, for example, on whether the evaluation unit and the control apparatus or drive can communicate directly with one another. If this is not the case since, for example, the two structural units are delivered to a different manufacturer, it may be advantageous to provide a transmission apparatus which allows communication of this kind and data flow of this kind. Communication of this kind between the evaluation unit, transmission unit and control apparatus/drive can also take place by radio.

One way of determining the current angular position of the movement element involves establishing the time period for which the drive or the motor has already been in operation. If the speed of the motor specifically is known, it is possible to derive the current angular position of the movement element from this. However, if the angular position is determined in this way, corresponding deviations in the actual angular position of the movement element from the angular position which is determined over time may occur if, for example, the assumed speed of the motor does not correspond to the actual speed. The result of this would be that the monitoring device would ultimately blank out a region which does not correspond to the actual position of the movement element. This, in turn, could lead to either the movement of the movement element being stopped, even though no object could actually cause a collision, because the movement element itself is incorrectly deemed to be an object of this kind or, in the case of an opening sensor, to the door being opened even though no one is in the corresponding region in the vicinity of the door but the movement element is deemed to be an, approaching person of this kind. Conversely, there is once again the risk of an object or an approaching person being deemed to be the movement element and, in this way, a collision with the movement element can occur, or else the door is not opened or is opened only too late. Accordingly, it may be advantageous to provide a separate angle measuring apparatus which determines the current angular position of the movement element. An angle measuring apparatus of this kind may be an angle encoder which is integrated in the drive or in the motor, but a separate sensor which determines the angular position of the movement element is also feasible. The angle measuring apparatus can operate by means of a mechanical coupling.

In an exemplary embodiment of the present invention, it is feasible for the angle measuring apparatus to comprise a lever which is mechanically coupled to, for example rotatably mounted on, the movement element. Furthermore, the angle measuring apparatus is then designed to detect the angular position of the movement element by means of the displacement of the lever when the movement element moves. In the case of a pivoting door, the lever can, for example, likewise execute the rotary movement together with the movement element. However, it also feasible, for example, for the lever to be guided in a slotted link on the sensor side and therefore for the pivoting movement to be converted into a linear movement. It is important that an angular position of the movement element can be unambiguously assigned to the corresponding position of the lever. In this case, the angle measuring apparatus identifies the position which the lever is in. The lever is used as a measurement sensor to a certain extent. An embodiment of this kind can likewise be realized in a cost-effective and reliable manner.

However, the angle measuring apparatus can also operate in an optical manner. Essentially two embodiments are feasible here, specifically firstly that the angle measuring apparatus is in the form of an optical distance sensor which determines the angular position of the movement element. If the distance sensor is fitted at a fixed point, the distance or spacing from the sensor also changes as a pivoting door executes the pivoting movement. This information can be employed such that an angular position of the movement element can be unambiguously assigned to the distance.

Another optical detection option is also feasible. The optical sensor can transmit a light beam, for example, which is at least partially reflected at a defined point of the pivoting door and then strikes a receiver. When the movement element moves, that is to say, for example, when the door pivots, the angle of the movement element in relation to the beam striking it changes. The reflected signal is therefore reflected at another angle and strikes the receiver at another point or at another angle. This deviation can be established. In the case of a vertically rotatably mounted door, a beam which runs in a horizontal direction, for example, can be directed at the door, wherein the reflection then changes its position horizontally and in a line. The light source used may be, for example, an LED (light-emitting diode) spotlight. The sensor can comprise, for example, a linear array sensor which ascertains the position of the spotlight depending on the door opening.

In a development of the invention however, the angle measuring apparatus can also be integrated in the sensor itself, which means that the angle measuring apparatus is not in the form of a separate sensor, and therefore the sensor for detecting the object and for monitoring the spatial angle additionally has the function of the angle measuring apparatus for the purpose of determining the angular position of the movement element. This can also provide cost advantages since no additional sensor has to be provided; a saving in respect of space is also possible. In this context, it is important for it to be possible to draw a distinction between the movement element and another object by additional information being transferred. This additional information can be acquired by a received signal having a characteristic shape if it originates from the movement element. When distance sensors, for example ToF sensors are used, it is feasible, for example, for a characteristic distance of the door to be established, for example, when the door leaf is detected by the detection radiation, the door leaf being at a constant spacing from the sensor when it is pivoted about the sensor which is located in the region of the rotation axis.

However, it is also feasible to provide a marking unit which can be fitted to the movement element such that it can be detected by the angle measuring apparatus when the movement element moves. The marking unit can be designed in such a way that it can be identified by the evaluation unit as a reference marking for determining the angular position of the movement element on account of its optical properties. This reference marking can be configured in a simple manner such that it can be concluded that it is not an object or a person that is in the corresponding region. The marking unit also provides the advantage that it can be employed in a virtually universal manner. If the marking unit is fastened to the door leaf, for example, this can be done in an inconspicuous manner, and therefore the user does not really see this marking, even when glass doors are used. An embodiment of this kind is generally unproblematic, specifically when the monitoring apparatus is retrofitted to the existing door systems, since it can be fitted to virtually any door system and can be used with any door system. The marking unit is ideally fastened to the door leaf on the hinge side in the vicinity of the sensor, for example directly on the hinge-side edge of the door leaf or in a region up to 10 cm away from the edge of the door leaf. As a result, the ToF sensor can identify the situation a sudden change in a detected distance as a measure of the angular position of the door leaf when the distance corresponds to the characteristic distance between the sensor and the marking unit.

However, it may not be necessary to fit a marking unit of this kind at all. It is also feasible for the sensor to be designed to detect a point on the movement element as a reference marking for determining the angular position of the movement element. In this embodiment, it is important for the corresponding point to have optical or reflection properties such that the evaluation unit can reliably sense a distinction of this kind. It is feasible for a characteristic distance from the door handle or a characteristic reflection from the door handle to be identified as a corresponding point on the movement element. For example, the door handle can be detected by the sensor. An embodiment of this kind has the particular advantage that a marking unit can be saved and therefore the situation of the marking unit having an objectionable effect on the appearance of the door can always be avoided.

In many cases, it is advantageous to fit a marking unit according to one embodiment of the invention when, on account of the steep angle at which a detection beam from the monitoring apparatus strikes the movement element, no reflected signal or only a very weak reflected signal can re-enter the receiver of the monitoring apparatus. In the worst case, the angle tends toward 180°. Since the marking unit can be designed and fitted such that the signal strikes the surface at a less steep angle, ideally 90°, a higher intensity of the return reflection can be expected. The measurement can therefore be significantly improved.

In order to possess a corresponding characteristic property, the marking unit can at least partially have a diffusely scattering surface. As a result, it is possible for a point which atypically reflects back, specifically diffusely scatters, the light in relation to other objects or persons to be detected in this detected angular region, as a result of which the movement element can be identified.

It is also feasible, in principle, for an opposite property to be utilized by, for example, a reflection element being provided which therefore reflects back a signal which has a high intensity. This embodiment can be used particularly when the ToF sensor is used as a simple optical sensor, for example a photodiode, a phototransistor or a quadrant diode.

The monitoring apparatus within the meaning of the invention can firstly be in the form of a safety sensor, in the form of an opening sensor or in the form of a sensor which simultaneously assumes the function of a safety sensor and an opening sensor.

The aim of the safety sensor is to stop the movement of the movement element in order to prevent undesired collisions with the object, while the opening sensor is used to open the movement element as the object approaches. However, the sensor can also perform both functions simultaneously. Since the two sensors are geared toward different objectives to a certain extent, in one case specifically starting the movement for opening the movement element and in the other case stopping the movement of the movement element, in order to avoid a collision, a strict distinction is required in this case too so that malfunctions do not result. An expedient distinction is that the monitoring area which is assigned to the opening sensor is a different monitoring area to that which is assigned to the safety sensor.

The first monitoring area, which is assigned to the safety sensor, is generally closer to the actual door. This first monitoring area generally comprises the movement region of the movement element, especially since there is, in principle, a risk of collision with the movement element in this region.

The second monitoring region, which is assigned to the opening sensor, is generally further away from the door since a person approaching the door has to be identified early so that the door can be opened in good time. If, for example, a person leaves the second monitoring region since he has in the meantime entered the first monitoring region, it is sufficient, for example, when the opening sensor holds open the door for a sufficient amount of time; if the person remains standing in the movement region of the door for example, the safety sensor ensures that there is no collision with the door since it has assumed monitoring in the first monitoring region. In this case, it is sufficient for the opening sensor to initiate opening of the door and to provide a sufficient possibility for the person to be able to pass through the opening of the door. In a particular refinement, a sensor can be designed such that it assumes the function of an opening and safety sensor. By way of example, the transmitter can be designed such that a portion of the emitted radiation runs only in the first monitoring region and a further portion runs only in the second monitoring region. An overlap between the first and the second monitoring region should generally be avoided since malfunctions may occur when an object is located in the overlap region between the first and the second monitoring region. In the case of a distance sensor, the two monitoring areas can be delimited by a specific distance or a specific boundary area, so that detected objects can be unambiguously assigned to the two monitoring areas on the basis of their distances.

In one embodiment of the invention, it is feasible, in particular, for the opening sensor to be separate and to have the function of an angle measuring apparatus, so that the current angular position of the movement element determined as a result is transmitted to the evaluation unit and is used to ensure that the opening sensor does not accidently deem an approaching person to be the movement element itself and attempt to open the door again when the door is being closed for example.

In a development of the invention, the transmitter can be designed such that it emits radiation in a broad spatial angle region. This is possible, for example, by means of a corresponding lens, for example a kind of fish-eye lens. It is also feasible, in principle, for the transmitter to emit radiation only in discrete regions of a spatial angle. However, it is generally necessary in this case for either a plurality of radiation-emitting transmitters or a plurality of light sources to be provided or, for example, for a perforated mask to provide the discrete regions. However, it is generally more cost-effective to provide a corresponding lens which allows for correspondingly wide-angle emission of radiation. In addition, this measure provides the advantage that the emitted light can enter a correspondingly wide region without individual gaps therebetween.

However, in the case of the receiver, it is generally advantageous for said receiver to detect only individual spatial angle regions. This can be done, for example, by individual component receivers being provided, these together forming the receiver but pointing in different directions, so that they can detect correspondingly different component spatial angles. Only this refinement makes it possible for a specially defined spatial angle region to be assigned to each receiver, as a result of which the angular position or position in space can already be encoded.

In addition, a pivoting door according to the invention is designed such that it comprises a door frame and a movement element which can be pivoted about a rotation axis and is fastened to the lateral door frame by means of a door hinge such that it can rotate, wherein the movement element can be pivoted between an open and a closed state of an opening of the pivoting door. The door frame can also be formed by the wall. The opening generally comprises the pivoting door making it possible to pass through a wall or a wall element to another space. The movement element closes this opening, wherein access through the opening is made possible when the movement element is opened. A monitoring apparatus according to the invention can advantageously be used for monitoring the movement in the case of the pivoting door.

In a particularly advantageous development of the invention, the sensor is arranged fixed in position, in particular on the lateral door frame and/or on the rotation axis and/or less than 50 cm or less than 20 cm above the floor, in particular so as to directly adjoin a lower door hinge. In particular, detection can be performed parallel to the floor. Therefore, the floor itself is not detected. However, detection close to the floor should be carried out with particular preference, especially since contact with the floor by a person or an object generally takes place independently of the size of the person or object.

The stationary fitting, which is performed on the opening side and the hinge side, is particularly advantageous in the invention. Arrangement on the opening side means that the sensor is arranged on the side of the door on which the pivoting movement of the movement element takes place. Fastening on the hinge side means that the fastening is performed in the location of the rotation axis of the movement element. The monitoring sensor is positioned to a certain extent at the origin or in the vicinity of the origin of the angular region about which the pivoting movement of the door takes place. This makes it possible for an angular region to be blanked out in a particularly simple manner.

Fitting the sensor with detection parallel to the floor and close to the floor can be compared, to a certain extent, with the advantages of a step contact mat which likewise utilizes the situation of a person tripping a contact in the floor region when he enters the door opening region. Blanking out can be performed in a simple manner by the door leaf angle position being detected and exactly this position being blanked out. The angle measuring apparatus or the angle sensor can, in principle, be located in the same housing as the safety sensor, for example when the sensor is identical to the angle encoder but also when, for example, an additional sensor is provided as an angle encoder, for example a mechanical or an optical sensor. A physical unit with the safety sensor can accordingly be ensured.

However, it is also feasible for a 3D door opening sensor to be separately provided, said 3D door opening sensor being arranged beneath or on the opening side on the upper horizontal door frame, the so-called door lintel, or on the opening side on the wall above the door opening or on the door lintel. This arrangement has the advantage that orientation in the second monitoring region, which is at a further distance from the door, is made possible in a simple manner. However, it is also feasible for the safety sensor and the opening sensor to be integrated in a unit, even when the monitoring apparatus is fastened in the lateral region closer to the rotation axis. The opening sensor can then be oriented such that its beams are oriented in an angular region close to 90° from the closed door, that is to say project into a region which is further away from the door.

The opening sensor, which is integrated in the monitoring apparatus, possibly together with the safety apparatus, can also be oriented, in particular, such that its monitoring region is situated outside the movement region or the first monitoring region. If the door itself or a marking unit on the door is detected, the door edge or the lateral door hinge generally constitutes a reference point. The distance sensor used can be, in particular, a 3D distance sensor, for example an 8×8 ToF sensor. When the safety sensor is arranged on the hinge side, it can be arranged such that it detects both the region in front of and the region behind the door when the door is not fully open or fully closed, wherein the region in which the door itself is located is blanked out. Furthermore, lighting means, but possibly also computation power, can be saved in an advantageous manner when opening and safety sensors are integrated in one device because the blanking out operation can be performed in a particularly simple manner and no further image processing is required.

In a preferred development of the invention, the regions in front of and behind the movement element (that is to say the opening side and the side averted from the opening) are monitored, specifically by two separate safety sensors. If the door is open, a person or an object which is located between the movement element and the door may, for example, not be able to be detected by the safety sensor which is fitted laterally to the door frame or by the opening sensor above the door. Therefore, a safety sensor can advantageously be fitted in the upper region of the door frame (or else above the door), the safety sensor monitoring this region. Furthermore, communication with this sensor in the upper region of the door frame can be provided, so that, for example, the sensor in the upper region of the door frame receives the information about the current angular position of the movement element and the spatial angular region which is therefore to be monitored at the present time.

BRIEF DESCRIPTION OF THE DRAWINGS

An exemplary embodiment of the invention is illustrated in the drawings and will be explained below with further details and advantages being indicated.

DETAILED DESCRIPTION OF THE INVENTION

Figure 1:
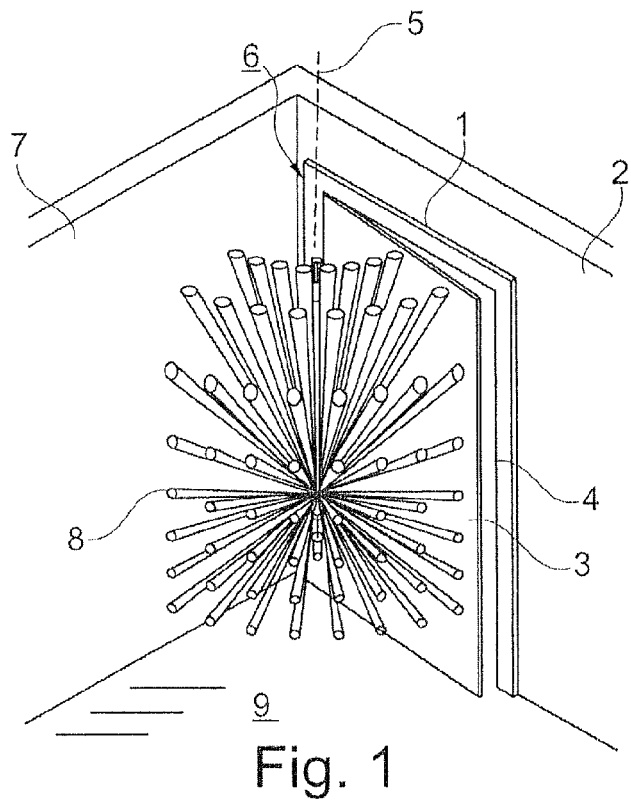
FIG. 1 shows a monitoring apparatus with monitoring in a space.

FIG. 1 shows a pivoting door 1 which is arranged in a wall 2 and has a movement element 3 which blocks off an opening 4 in the closed state and allows passage through the opening 4 in the open state. A monitoring sensor is arranged on the wall side of the door frame 6 in the region of the rotation axis 5. This monitoring sensor is arranged such that it is situated virtually at the origin of the angular region which the door 3 passes over as it pivots. The monitoring sensor itself is not illustrated in FIG. 1. It has a transmitter which emits light in a wide spatial region. The receiver of the monitoring sensor is once again designed such that it detects only discrete spatial angles. The total spatial angle, which is detected by the receiver or which is formed by the component spatial angles which in turn are detected by the receiver, is formed on the floor side such that the spatial angle runs horizontal above the floor and comprises individual planes in the vertical direction, the individual planes being situated between the pivoting door and the wall 7 which runs at 90° with respect to the wall 2. These component spatial angles are indicated by reference symbol 8. In the floor-side region (floor 9), the component beam bundles 8 run parallel to the plane of the floor 9.

If the movement element 3 is pivoted about the rotation axis 5, that is to say opened, it passes through individual component spatial angles 8. On account of a marking unit (not illustrated any further here on the door), the monitoring unit receives signals which can be assigned to the movement element. In the present case, a marking unit of this kind is a diffuse scattering device, and therefore the door or the movement element 3 can be unambiguously identified. As the pivoting movement of the door 3 increases in magnitude, the corresponding component spatial angle regions are successively passed through by the movement element. The corresponding angular region which can be assigned to the movement element 3, that is to say the current angular position of the door 3, can then be blanked out by the evaluation unit, that is to say this region is no longer available when an object is intended to be identified.

Figure 2:
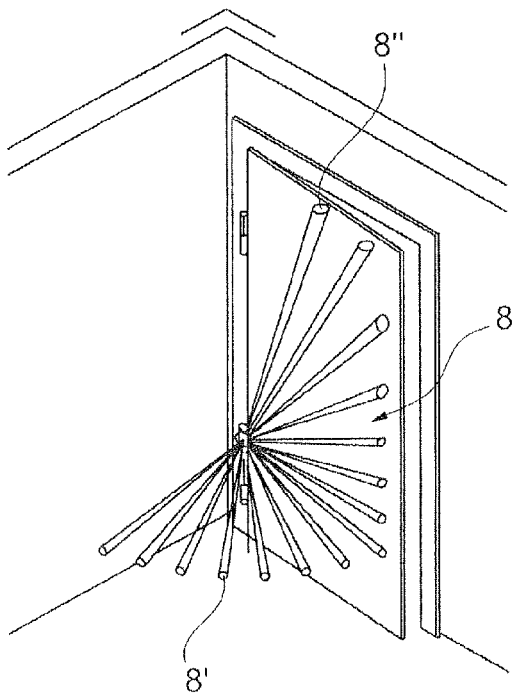
FIG. 2 shows a monitoring apparatus according to the invention with monitoring in a horizontal and vertical plane.

FIG. 2 shows a similar monitoring apparatus, wherein, however, only component spatial angles which run horizontally, that is to say parallel to the floor 9, and a vertical plane region with component spatial angles, which are oriented substantially parallel to the movement element, are detected in the present case. The component spatial angles, which are oriented in the horizontal direction, are denoted by the reference symbol 8'. They are sufficient to detect the current angular region of the door since one component spatial angle region after another is passed through by the door. Some of the receivers are advanced such that the component spatial angle regions 8" are detected in a region which is situated directly in front of the door, and therefore the corresponding region can be detected when the door is opened. It is also feasible for, from the perspective of FIGS. 1 and 2, a region behind the door to be detected if the corresponding sensor is correspondingly arranged.

Figure 3:
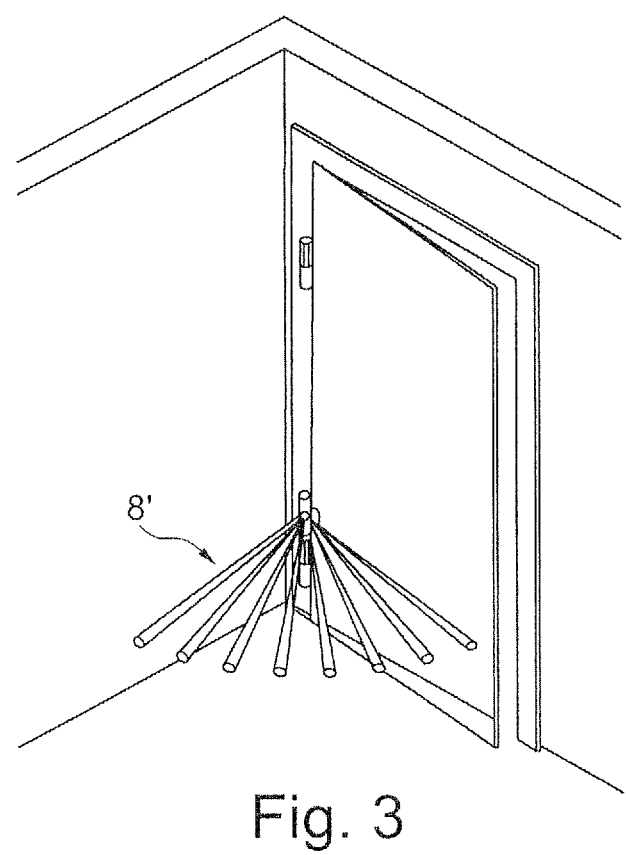
FIG. 3 shows a monitoring apparatus with monitoring in a horizontal plane.

FIG. 3 once again shows a monitoring apparatus in which only the floor-side region is scanned by individual component spatial angle regions 8'. An arrangement of this kind can be sufficient, in principle, since an approaching person remains substantially close to the floor. It is feasible for this horizontal plane, which comprises the component spatial angle regions 8', to be fitted at a level of between 0 cm and 70 cm (cm: centimeters) above the floor, in particular <60 cm, <50 cm, <40 cm, <30 cm, <20 cm and <10 cm. Otherwise, the detection region, which is detected, for example, by the receiver in the case of a ToF sensor, is a region which is a maximum of approximately 7.5 m (m: meters) away from the receiver.

Figure 4:
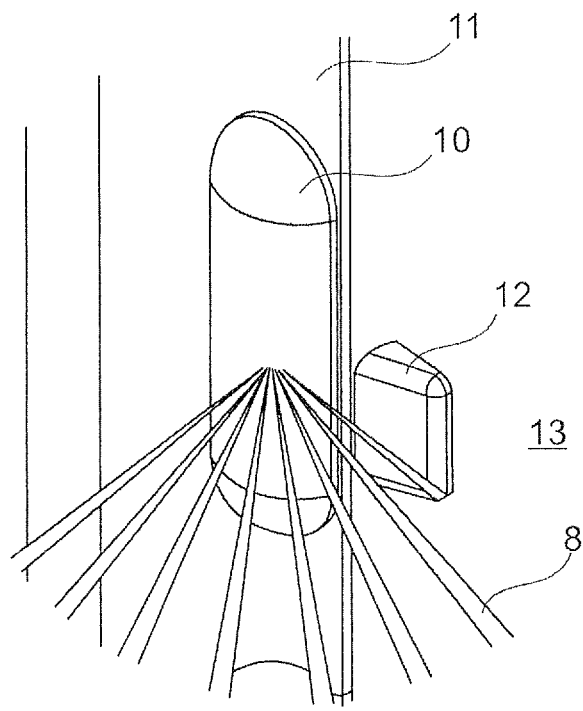
FIG. 4 shows a schematic detailed view of a monitoring apparatus.

FIG. 4 shows the monitoring apparatus 10 which is fitted in the lateral region on the door frame 11. Furthermore, a marking unit 12 is provided on a door 13. The marking unit 12 is an object with a diffusely scattering surface. In this example, the monitoring apparatus is in the form of a safety apparatus, wherein the receiver of the sensor detects component spatial angles 8 in the horizontal direction. The emitted light, which is emitted by the sensor, is not illustrated in any detail in the figure. If the diffuse scattering device 12 enters the region which is detected by a receiver, it is correspondingly detected and the angular position of the door 13 is correspondingly detected and taken into consideration by the evaluation unit. This means that an object is only identified when it does not correspond to this specific angular position which is assigned to the pivoting door. In the present case, the angle encoder is integrated in the safety sensor to a certain extent. An object which is located next to the door for example, that is to say cannot be allocated to the angular position of the movement element, is sensed to be an object which could, for example, cause a collision with the movement element 13, and therefore the movement of the movement element can then be blocked.

Figure 5:
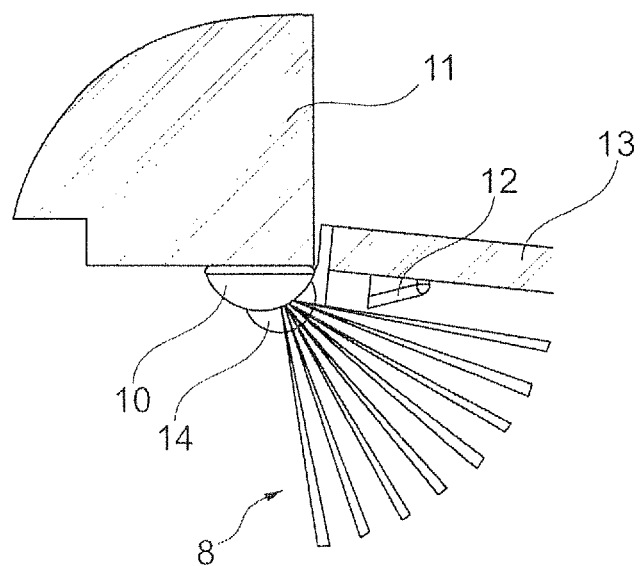
FIG. 5 shows a schematic plan view of a monitoring apparatus and a pivoting door.

FIG. 5 shows a plan view of the monitoring apparatus with the door frame and the door. FIG. 5 shows the door frame 11 to which the monitoring apparatus 10 is fastened, wherein the door 13 is fastened to the door frame in a rotatable manner by means of an articulation or door hinge 14. A diffusely scattering marking unit 12 is, in turn, fitted to the door. The monitoring apparatus 10 monitors a spatial angle which is formed by component spatial angles 8 which are, in turn, sensed by the receiver of the sensor 10. If light which is emitted from the transmitter of the sensor reaches the marking unit 12, it is diffusely scattered and the marking unit 12 is sensed. The corresponding angular region, which can then be assigned to the movement element 13, is blanked out by the evaluation unit which is integrated in the monitoring unit 10.

Figure 6:
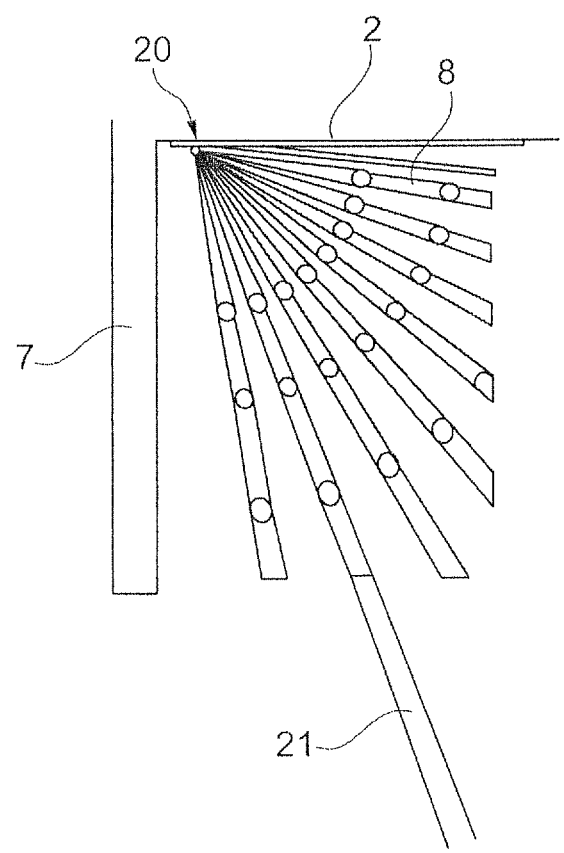
FIG. 6 shows a schematic illustration of a monitoring apparatus having a sensor which is in the form of a safety sensor and an opening sensor.

FIG. 6 shows the corner between two walls 2 and 7 and also a monitoring sensor 20 which monitors component spatial regions 8. However, the monitoring apparatus 20 is not only a safety apparatus but also an opening sensor which monitors a second monitoring region which is further away. This is illustrated by a receiver which is oriented toward a region, which is further away, over the component spatial region 21. Therefore, both a safety monitoring operation and an opening monitoring operation can be performed by a single monitoring apparatus.

Figure 7:
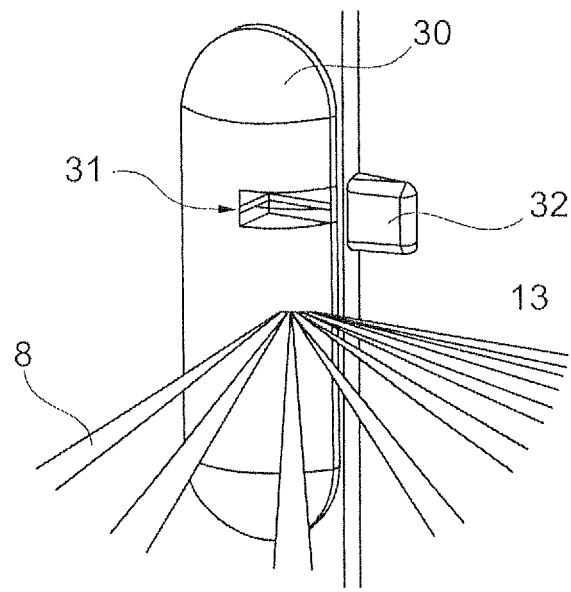
FIG. 7 shows a schematic illustration of the monitoring apparatus having a separate optical angle encoder.

FIG. 7 comprises a monitoring apparatus 30 which is fitted to a door frame and which again monitors a region by means of a safety apparatus in the horizontal direction over the component spatial regions 8. However, an angle encoder 31 which is in the form of an optical angle encoder is additionally integrated. The angle encoder comprises a light-emitting diode which creates a spotlight which is incident on a marking unit 32 on the movement element. This marking unit 32 on the movement element has a reflective surface, and therefore the corresponding light beam is reflected back again and finally strikes a linear array sensor of the sensor 31. When the door 13 is pivoted, the reflected beam moves along the line of the linear array sensor, and therefore an angular position of the movement element can be determined by the position. The evaluation unit is connected to the sensor 31 and can correspondingly blank out the current angular position of the movement element 13.

Figure 8:
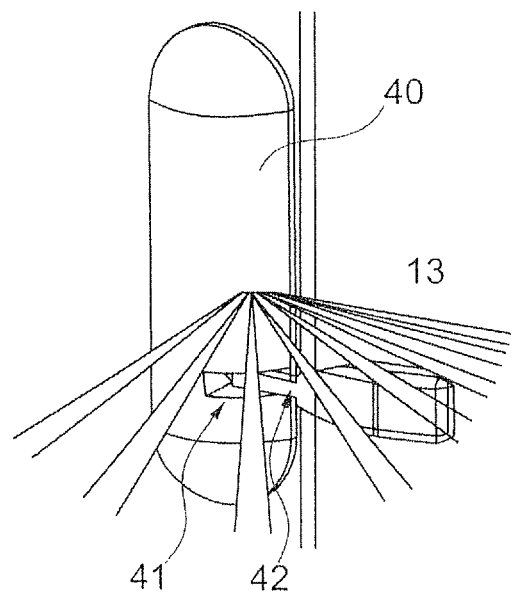
FIG. 8 shows a schematic illustration of the monitoring apparatus having a separate mechanical angle encoder.

FIG. 8 shows a similar monitoring apparatus to the monitoring apparatus 31 from FIG. 7. The monitoring apparatus 40 illustrated in FIG. 8 likewise monitors component spatial regions 8 in a horizontal plane in a safety apparatus. However, it additionally has a mechanical angle encoder 41. In the present case, the lever 42 is mounted in a rotatable manner on the sensor side and has a slotted link guide on the door side. The sensor 41 accordingly measures the rotation within the bearing in order to ascertain the current angular position of the movement element 13. However, it is also feasible for the bearing to be arranged in the opposite way and for a slotted link guide to be provided on the sensor side. Accordingly, the current angular position is also blanked out in this embodiment, analogously to that in FIG. 7.

Figure 9:
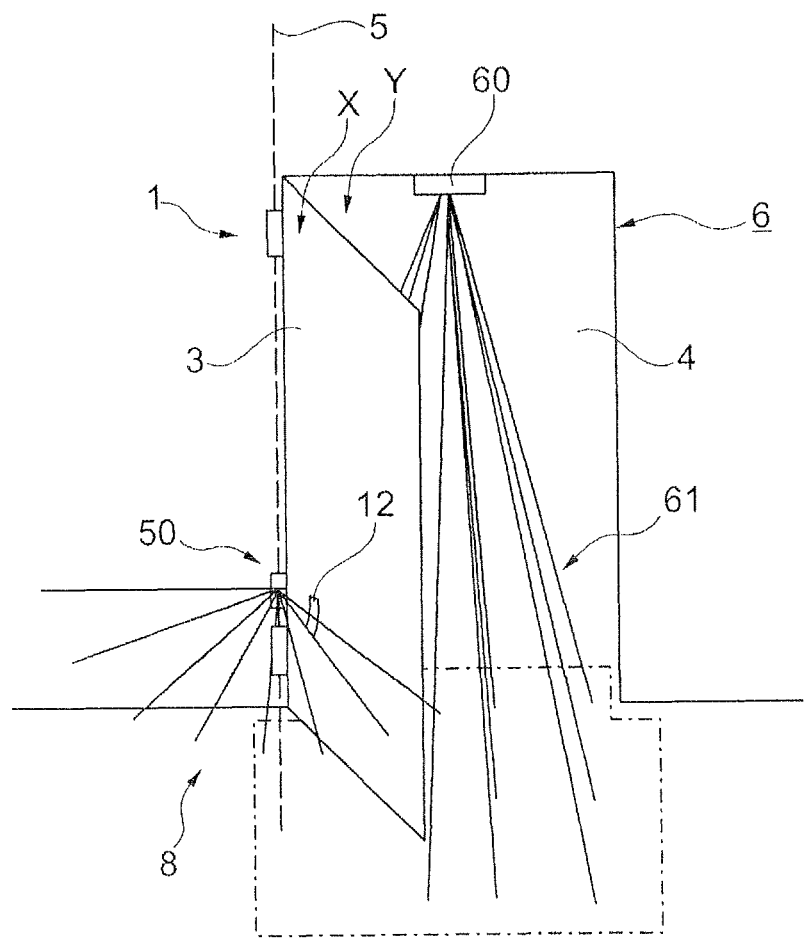
FIG. 9 shows a schematic illustration of a monitoring apparatus having two safety sensors.

FIG. 9 shows a pivoting door 1 with a door frame 6 and a movement element 3 which is mounted such that it can rotate about an axis 5 and is driven by a motor. The opening 4 is opened and closed by the movement element 3. The side X which is averted from the opening is monitored by the safety sensor 50 of the monitoring apparatus (horizontally running region 8), while the opening-side region Y is monitored by the safety sensor Y (spatial angle 61). The sensor 60 is informed of the current angular position of the door, and therefore said sensor can adapt to the spatial angle 61 which is to be monitored.

LIST OF REFERENCE SYMBOLS

1 Pivoting door
2 Wall
3 Movement element
4 Opening
5 Rotation axis
6 Door frame
7 Wall
8 Component spatial region
9 Floor
8' Horizontal component spatial region
8" Vertical component spatial region
10 Monitoring apparatus
11 Door frame
12 Marking unit
13 Movement element
14 Door hinge
20 Monitoring apparatus
21 Subregion of the 2nd monitoring region
30 Monitoring apparatus
31 Optical angle encoder
32 Reflection unit
40 Monitoring apparatus
41 Mechanical angle encoder
42 Lever
50 First safety sensor
60 Second safety sensor
61 Monitored spatial angle
X Region which is averted from the opening
Y Opening-side region

The invention claimed is:

1. A monitoring apparatus for monitoring movement of a movement element which is mounted such that the movement element can be pivoted about a rotation axis and driven by means of a drive, wherein the movement element can be pivoted between an open and a closed state of an opening, the movement element comprising a pivoting door mounted such that the movement element can rotate about a rotation axis by means of a door hinge and can be moved about the rotation axis by means of a motor, wherein the monitoring apparatus has a sensor for detecting an object and for monitoring a spatial angle having an origin in a region of the rotation axis, wherein the sensor can be fitted in the region of the rotation axis and comprises a transmitter and a receiver for transmitting and receiving electromagnetic detection radiation within the spatial angle, and wherein the sensor is designed to emit detection signals generated by the receiver when electromagnetic radiation is detected, wherein the monitoring apparatus comprises an evaluation unit which evaluates the detection signals depending on an angular position of the detected radiation in the spatial angle and determines at least one of whether the object has been detected and a position of the object, wherein the evaluation unit distinguishes between the movement element and the object depending on a current angular position of the movement element.

2. The monitoring apparatus according to claim 1, wherein the sensor for detecting the object and for monitoring the spatial angle is a distance sensor that determines a distance to the object and wherein the distance sensor is a time-of-flight sensor (ToF sensor).

3. The monitoring apparatus according to claim 1, further comprising a transmission apparatus designed to be connected to at least one of a control apparatus for controlling the drive of the movement element and to the drive, and to transfer data signals containing information about the current angular position of the movement element and from at least one of the control apparatus and the drive to the evaluation unit, wherein the transmission apparatus receives or sends said data signals.

4. The monitoring apparatus according to claim 1, further comprising an angle measuring apparatus for measuring the current angular position of the movement element.

5. The monitoring apparatus according to claim 4, wherein the angle measuring apparatus comprises a lever mechanically coupled to the movement element and is designed to detect the current angular position of the movement element by means of a displacement of the lever when the movement element moves.

6. The monitoring apparatus according to claim 4, wherein the angle measuring apparatus comprises an optical sensor which determines the current angular position of the movement element, wherein the sensor is a distance sensor or a linear array sensor for determining a deviation of a reflected signal.

7. The monitoring apparatus according to claim 1, wherein the sensor for detecting the object and for monitoring the spatial angle is an angle measuring apparatus for determining the current angular position of the movement element.

8. The monitoring apparatus according to claim 1, further comprising a marking unit fitted to the movement element such that the movement element can be detected by the angle measuring apparatus when the movement element moves, wherein the marking unit can be identified by the evaluation unit as a reference marking for determining the current angular position of the movement element based on optical properties of the marking unit.

9. The monitoring apparatus according to claim 8, wherein the marking unit has an at least partially diffusely scattering surface.

10. The monitoring apparatus according to claim 1, wherein the sensor is designed to detect a point on the movement element as a reference marking for determining the current angular position of the movement element.

11. The monitoring apparatus according to claim 1, wherein the sensor is a safety sensor that stops movement of the movement element to prevent undesired collisions with the object, wherein the safety sensor monitors a first monitoring area and stops the movement when the object is detected in the first monitoring area, or an opening sensor for opening the movement element when the object approaches, wherein the opening sensor monitors a second monitoring area and moves the movement element to the open state by means of the drive when the object is detected in the second monitoring area.

12. The monitoring apparatus according to claim 1, wherein the transmitter of the sensor emits detection radiation at least to the entire spatial angle which is to be monitored.

13. The monitoring apparatus according to claim 1, wherein the receiver of the sensor comprises at least two component receivers that each detect electromagnetic radiation from a limited subregion of the spatial angle.

14. The monitoring apparatus according to claim 1, wherein the monitoring apparatus comprises at least two sensors for detecting an object and for monitoring a spatial angle, wherein one of the at least two sensors monitors an opening-side spatial angle region on one side of the movement element, and another of the at least two sensors monitors a spatial angle region which is averted from the opening on another side of the movement element opposite to the one side.

15. The monitoring apparatus according to claim 14, further comprising a transfer apparatus for transferring at least one of information and instructions between the sensor for monitoring the opening-side spatial angle and the sensor for monitoring the spatial angle which is averted from the opening.

16. The monitoring apparatus according to claim 1, wherein the movement element is fastened to a door frame by means of a door hinge such that the movement element can rotate.

17. The monitoring apparatus according to claim 16, wherein the sensor is fixed in a position, on at least one of a lateral lintel, the rotation axis, and less than 50 cm above a floor so as to directly adjoin a lower door hinge.

18. The monitoring apparatus according to claim 16, wherein the sensor for monitoring an opening-side spatial angle is fitted on a lateral door frame, and the sensor for monitoring a spatial angle which is averted from the opening is fitted in the upper region of the door frame.

* * * * *